United States Patent [19]
Maxwell et al.

[11] Patent Number: 5,917,901
[45] Date of Patent: *Jun. 29, 1999

[54] TELECOMMUNICATIONS SYSTEM

[75] Inventors: Deborah Claire Maxwell, Cox Green; Brian Ronald Day, Norbury, both of United Kingdom

[73] Assignee: Northern Telecom Limited

[ * ] Notice: This patent issued on a continued prosecution application filed under 37 CFR 1.53(d), and is subject to the twenty year patent term provisions of 35 U.S.C. 154(a)(2).

[21] Appl. No.: 08/549,685

[22] PCT Filed: Apr. 15, 1993

[86] PCT No.: PCT/GB93/00800

§ 371 Date: Dec. 18, 1995

§ 102(e) Date: Dec. 18, 1995

[87] PCT Pub. No.: WO94/24801

PCT Pub. Date: Oct. 27, 1994

[51] Int. Cl.$^6$ ..................................................... H04M 7/06
[52] U.S. Cl. ........................... 379/229; 379/207; 379/230
[58] Field of Search .................................... 379/219, 220, 379/225, 229, 230, 231, 234, 207

[56] References Cited

U.S. PATENT DOCUMENTS

| | | | |
|---|---|---|---|
| 4,313,036 | 1/1982 | Jabara et al. | 379/225 |
| 5,339,356 | 8/1994 | Ishii | 379/225 |
| 5,455,855 | 10/1995 | Hokari | 379/225 |
| 5,483,589 | 1/1996 | Ishida et al. | 379/220 |
| 5,517,564 | 5/1996 | Slater et al. | 379/229 |

*Primary Examiner*—Ahmad F. Matar
*Attorney, Agent, or Firm*—Lee, Mann, Smith, McWilliams, Sweeney & Ohlson

[57] ABSTRACT

A telecommunications system comprises a public network and one or more private networks each comprising a plurality of private exchanges (PBX's) coupled to the public network. Signal mapping from PBX to public format and inverse mapping from public to PBX format provides transparent signalling of PBX calls across the public network. This avoids the use of dedicated private lines for the private network traffic.

5 Claims, 8 Drawing Sheets

Transit Scenario: DPNSS to DPNSS, carried over ISUP.

Fig. 3.

Mapping of Messages between DPNSS and ISUP.

Fig. 4.

Mapping of Parameter Information between DPNSS and ISUP

Fig. 5.

Successful DPNSS Single Message Set-up over ISUP.

Fig. 6.

Pre-Conversation Phase

Release in the Forward Direction.

Fig. 9.

Release in the Backward Direction.

Fig. 11.

Mapping of Messages between DPNSS and TSL.

Fig.10.

CCS7 Architecture for 'Virtual' calls.

Fig.12.

Transit Case: DPNSS to DPNSS

Fig.13.

DPNSS Virtual Call via TSL: Handling of
Additional DPNSS Messages

Fig.14. DPNSS Virtual Call via TSL:Premature Release

Fig.15. DPNSS Virtual Call via TSL

TELECOMMUNICATIONS SYSTEM

This invention relates to telecommunications, e.g. telephone systems and in particular to systems incorporating one or more private network.

BACKGROUND OF THE INVENTION

A conventional telecommunications private network comprises a number of private exchanges or switches (PBX's) interconnected via private telephone lines and each of which serves a number of telephone or user terminals. The PBX's of the private system are interconnected by private leased lines which are installed by the appropriate telephone service supplier. Call routing and call handling within the private network are controlled via the PBX's.

In addition to a basic telephony service (POTS) a private network is generally required to provide additional features such as call forwarding, call transfer, ring-back when free and conference calls. These features are not in general provided on a public network as they are specific requirements of business rather than domestic subscribers.

A further service that is finding increasing usage is that of providing a direct dialling facility to telephone extensions attached to a PBX. For example the CENTREX system provides such a service.

The provision of private leased lines represents a significant capital investment by the telephone service supplier. Furthermore these leased lines represent an underused asset as they are in significant use, for only a part, typically about one third, of the twenty four hour cycle. However, during their idle period, these lines are not available to carry telephone traffic, e.g. to reduce an overload, for subscribers other than the private user to whom the lines have been leased. Expansion of the network is also difficult, as new dedicated lines have to be provided for new business subscribers.

OBJECT OF THE INVENTION

An object of the invention is to minimize or to overcome the above disadvantage.

It is a further object of the invention to provide a system in which calls between PBX's are routed via a public network.

It is a further object of the invention to provide a system that is fully compatible with the above mentioned direct dialling facility.

SUMMARY OF THE INVENTION

According to the invention there is provided a telecommunications system incorporating a public network and one or more private networks, each said private network having a plurality of nodes between which communication is, in use, performed via the public network, and wherein the public network has means for providing a transparent communications path between the nodes of each said private network.

According to the invention there is further provided a telecommunications system incorporating a public network, and one or more private networks each comprising a plurality of private exchanges (PBX's) and between which communication is, in use, performed via the public network, the system having means for mapping call signalling information from a said private network to the public network and inverse mapping call signalling information from the public network to that private network whereby to provide a transparent communications path via the public network between the private exchanges of each said private network.

According to another aspect of the invention there is provided a method of providing telecommunications signalling between a plurality of nodes or private exchanges (PBX's) constituting a private network, the signalling being performed via a public network, the method including mapping signalling information associated with each private network message to corresponding signalling information associated with the public network, routing the message across the public network, and inverse mapping the signalling information associated with the public network to the signalling information associated with the private network whereby to provide a transparent communications path between the exchanges of the private network.

By providing a transparent signalling path between the nodes of the private network, all the call handling features of the private network are available to users of that network even though these features may not be provided by the public network itself. The private network calls are routed via the public network rather than via conventional dedicated leased lines or 'tie lines' making more efficient use of the public network capacity. The public network in effect provides virtual tie line connections between the PBX's of the private network.

The technique is of particular application to system employing a digited private network signalling system e.g. the DPNSS (RTM) private network common channel signalling protocol, but it will be appreciated that the technique is in no way limited to that particular signalling protocol. The technique is also applicable e.g. to the QSIG European PBX signalling standard. The public network also has a common channel signalling capability and may for example employ the CCS7 (common channel signalling system) protocol such as the DMS (RTM) digital multiplex system, although it will again be appreciated that the invention is not limited to this particular public switch. The DPNSS protocol is a common channel signalling system, primarily for use within private networks, to provide telephony, data services, and a range of supplementary services. DPNSS contains circuit related ('Real Call') procedures, and circuit independent ('Virtual Call') procedures to provide these services. In order to provide DPNSS transparency over CCS7 we support equivalent mechanisms. DPNSS 'Real' calls are progressed across CCS7 using the integrated Signalling Digital Network User Part (ISUO), and DPNSS 'Virtual' calls are progressed using the CCS7 Transaction Sub-Layer (TSL) and the Signalling Connection Control Part (SCCP).

We achieve this transparent carriage by reconstituting the DPNSS information at the CCS7 end nodes so that full DPNSS functionality is provided. In order to provide the required functionality, the system operates according to the following principles.

Any information that can be mapped uniquely between DPNSS and CCS7 messages, and therefore can be reconstituted completely, is interworked at a CCS7 end node. I.e. this information will not need to be carried transparently within the CCS7 message as well as being mapped. Any DPNSS information that can not be mapped uniquely, but can be used to set appropriate CCS7 parameters is utilised, but is also carried transparently within the CCS7 message. Any DPNSS information that has no relevance at all to the CCS7 message is carried transparently within the CCS7 message.

BRIEF DESCRIPTION OF THE DRAWINGS

An embodiment of the invention will now be described with reference to the accompanying drawings in which.

DESCRIPTION OF PREFERRED EMBODIMENT

In the following description of the preferred embodiment, particular reference is made to the DPNSS private signalling system and to the DMS public switching system. It will be appreciated that the description of the invention with those two systems is given by way of example only and that exploitation of the invention is in no way limited to the use of both or either of these particular systems.

Figure 1:
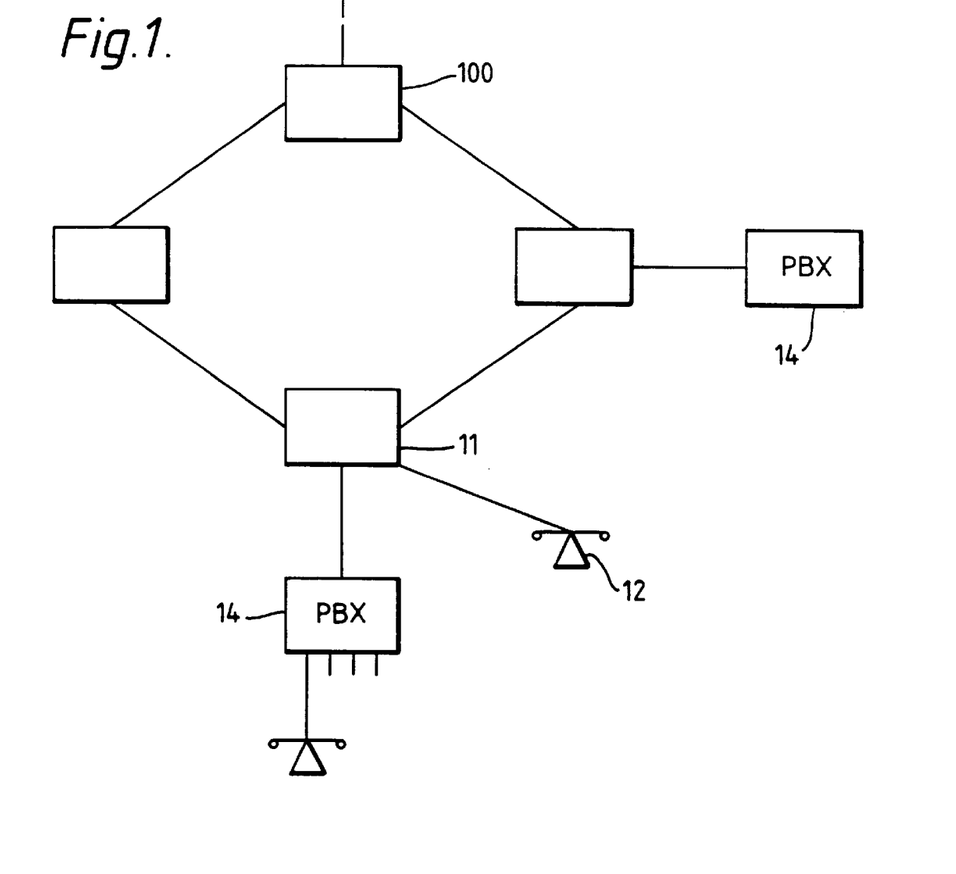
FIG. 1 is a schematic design of a telecommunications system in which private network traffic is carried via a public network.

Referring to FIG. 1, the public network incorporates a number of nodes 11 each of which may comprise e.g. a switching office or a signal transfer point. A switching office is a node which is host to a number of system users and acts as a source and sink of user generated messages. A signal transfer point is a node which tandems messages between switching offices. Selected nodes of the public network may comprise e.g. gateway switches 100 to permit communication with other networks.

The public network is accessed by a plurality of subscribers some of which comprise single telephones 12 and others of which comprise a plurality of private exchanges (PBX's) 14, the private exchanges forming the nodes of a private network.

Signalling within the system of FIG. 1 is performed via a common channel signalling (CCS) protocol. This technique partitions the control of a call from the voice path so that inter-office communication is based on a request data exchange capability. This contrasts with conventional per-trunk signalling (PTS) in which a call's control signal and voice signals are multiplexed on to the same trunk.

Figure 2:
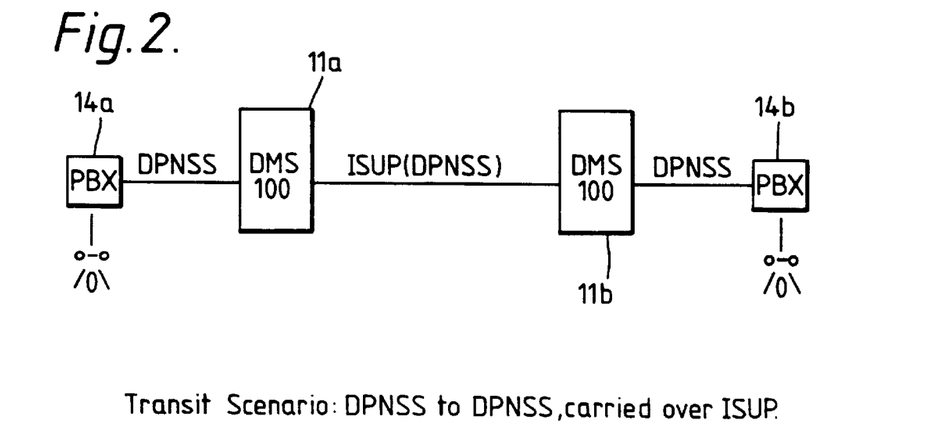
FIG. 2 illustrates the manner in which calls are routed across the network of FIG. 1.

In the system of FIG. 1, calls between PBX's are routed across the public network using quasi-associated signalling, this technique being illustrated schematically in FIG. 2. Messages relating to a particular signalling relation between a pair of PBX's, 14a, 14b are conveyed over two or more linksets in tandem passing through one or more nodes 11a, 11b of the public network. For calls between PBX's, the public system nodes function as signalling transfer points to provide physical communication between the PBX's 14a, 14b, to provide in effect a virtual communications path directly between the PBX's of the private network.

Figure 3:
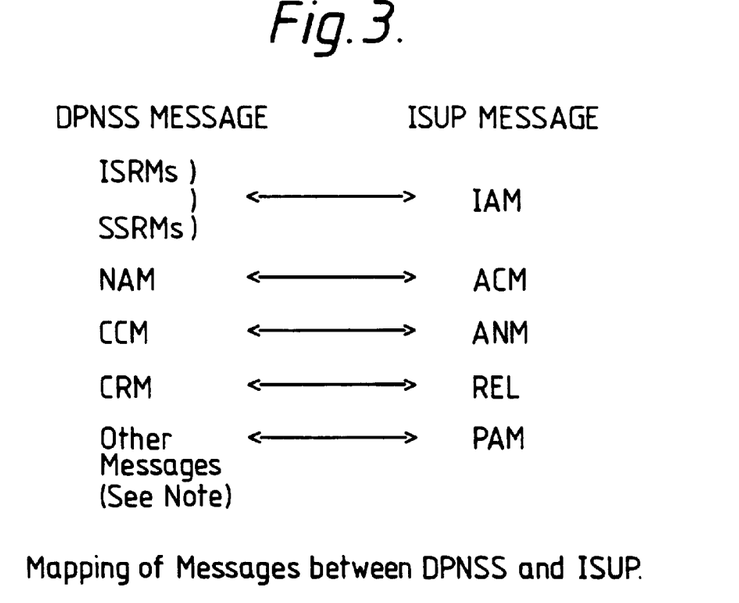
FIGS. 3 and 4 illustrate respectively the high level mapping of message and parameter information in the system of FIG. 1.
Figure 4:
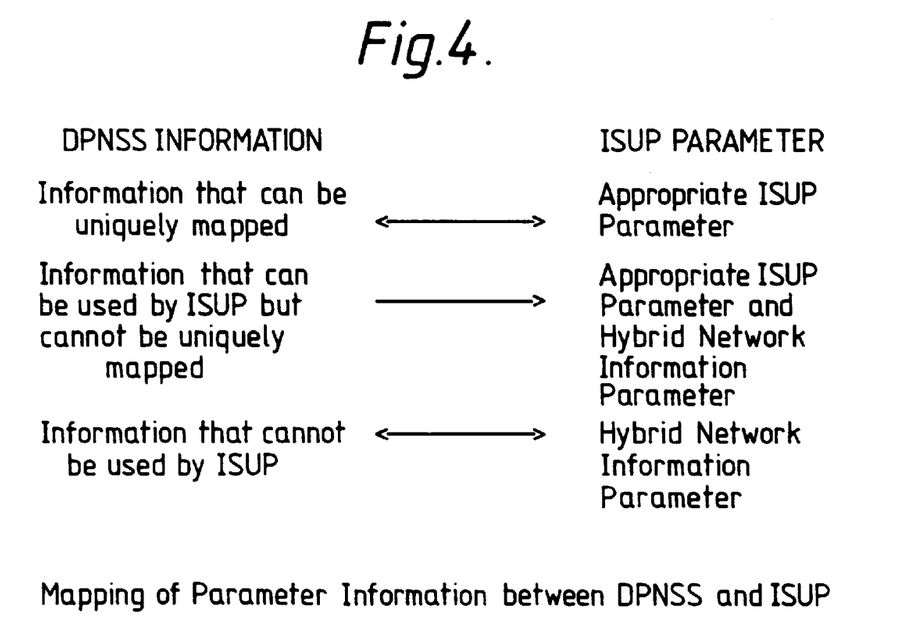

To achieve transparency of a communications path between PBX's, we provide mapping of both message information and parameter information between the private network DPNSS information and the integrated signalling digital network user part (ISUP) associated with the public network. The high level mapping of message and parameter information are illustrated respectively in FIGS. 3 and 4 of the drawings.

The private network calls routed via the public network are of two types; real calls and virtual calls. A real call requires establishment of a connection between two parties and can carry speech or data. A virtual call is a mechanism for communicating information between nodes when a physical circuit connection is not required, e.g. when making a call-back when free request.

Real Calls

For 'Real' calls the signalling messages and related procedures are sectioned into the following call phases:

Successful Call Set-up Phase

This phase begins with an initial address message, and ends with the receipt of an address complete message, indicating all digits have been successfully received at the terminating end.

Unsuccessful Call Set-up Phase

This phase begins if any unsuccessful backward signal is received in response to an initial address message. The action taken on receipt of such a signal may be to reattempt the call on another circuit, or to enter the Release Phase, and clear the call attempt.

Pre-Conversation Phase

This phase begins with the receipt of the address complete message, and ends when an answer message is received.

Speech Phase

This phase begins with the receipt of an answer message, and continues until the call is released.

Release Phase

This may be initiated from any other phase during the call. The call will be released, and trunks will be passed to the Idle Phase Idle Phase Interaction between trunk maintenance and call processing will occur in this phase.

For each phase a description of the mapping required is given below.

In the successful call set-up phase the following procedures occur. The first message to arrive at the originating public system node is a DPNSS ISRM(C). The ISRM(C) message is the first message to be sent in the call set-up phase, it is only applicable in this phase, and can only pass in the forward direction. This message contains all the selection information needed to progress the call, and may also contain information relating to supplementary service requests. All this information is carried in the DPNSS Selection Block, which may be up to 44 octets in length.

Figure 5:
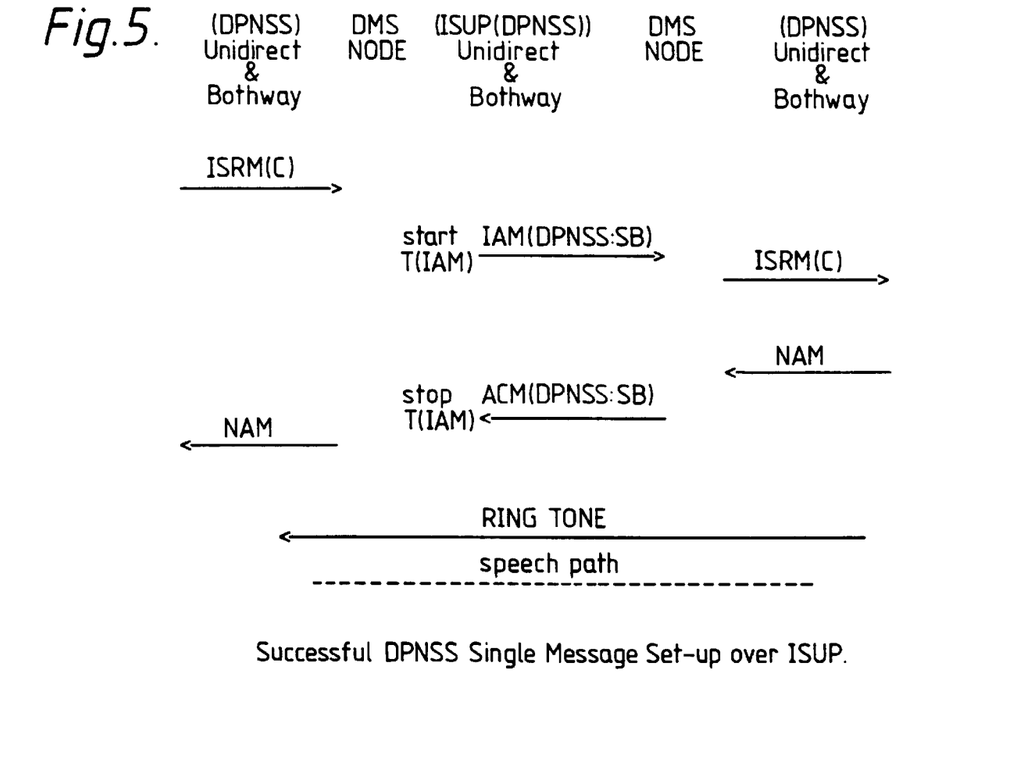
FIG. 5 illustrates the call set-up process.

When the DPNSS ISRM(C) message is received at the public system node, the calling line category (CLC) is examined for compatibility with the outgoing route and the service indicator field is screened to determine whether or not the call is allowed to continue. The procedure is illustrated in FIG. 5 of the drawings.

Unsuccessful Call Set-up Phase

This phase is initiated in one of the following ways:

An internal DMS treatment is set. A DPNSS message is received with an invalid service indicator code. The call will be handled as specified in reference 3.

An ISUP Release Message (REL) is received.

Figure 12:
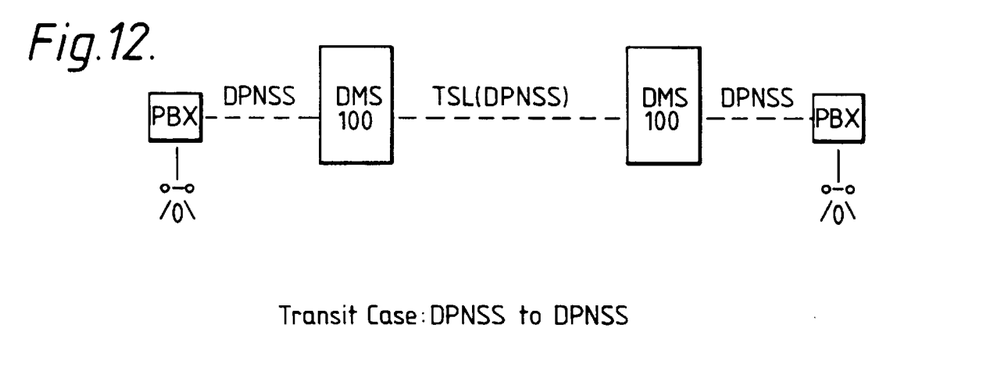
FIG. 12 illustrates the transmit mechanism of virtual calls.

If the failure occurred in the terminating DPNSS network the ISU P REL message contains DPNSS Indication Block information, which is passed to DPNSS, and a DPNSS CRM is generated (see FIG. 12 on page 38). If the failure occurred in the DMS ISUP network the ISUP REL message is mapped to a DPNSS CRM.

An ISUP Blocking Message (BLO)/ Reset Circuit Message (RSC)/ or an Unrecognised Message is received, from the DMS ISUP network. The DMS network isolates the related circuit and repeats the call attempt on another circuit.

Pre-Conversation Phase

This phase begins with the receipt of a backward DPNSS Number Acknowledge Message, and generally ends with the receipt of an DPNSS Call Connected Message (CCM).

On receipt of the DPNSS NAM message the DMS generates an ISUP ACM, from the information received within the DPNSS Indication block, and from information held at the DMS. The DPNSS SM message is always accepted, as 64 K bit/s clear capability is always assumed. On receipt it is mapped into an ISUP PAM message and sent over the preceding link.

Any other DPNSS message received in the backward direction, other than CCM or unrecognised or invalid link-by-link messages are mapped into an ISUP PAM and sent over the preceding link. In the case of EEM(I)'s and EEM(C) all the information will be collected at the node before being mapped into an ISUP PAM. This will also be true for LLM(I)s and LLM(C).

Figure 6:
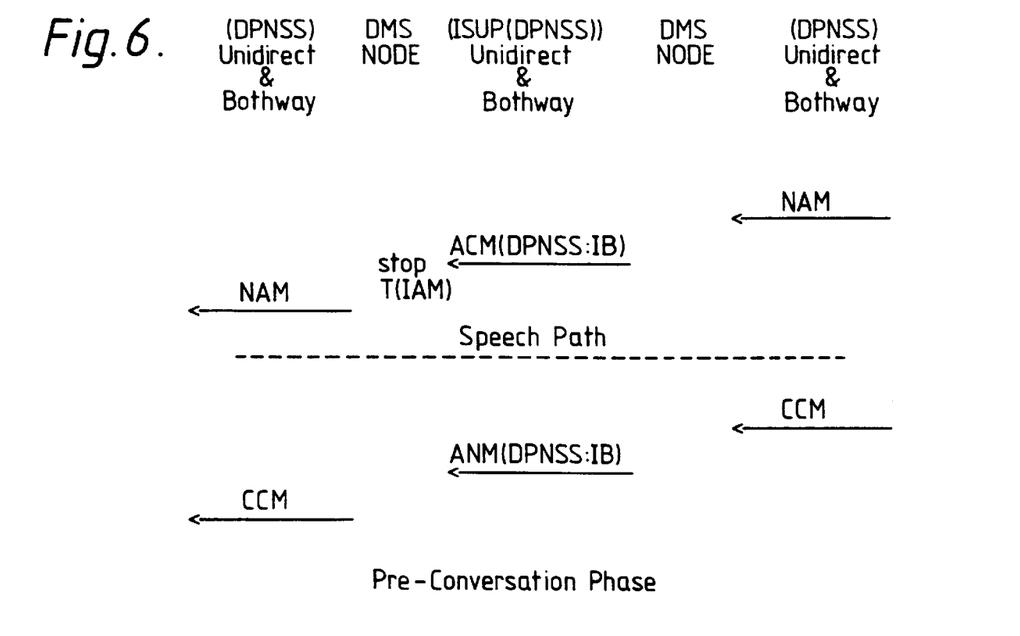
FIG. 6 illustrates the pre-conversation phase of a call.

On receipt of a DPNSS CCM message, an ISUP ANM is generated and is sent over the ISUP link, the procedure being illustrated in FIG. 6.

Call Duration (Speech) Phase

Figure 7:
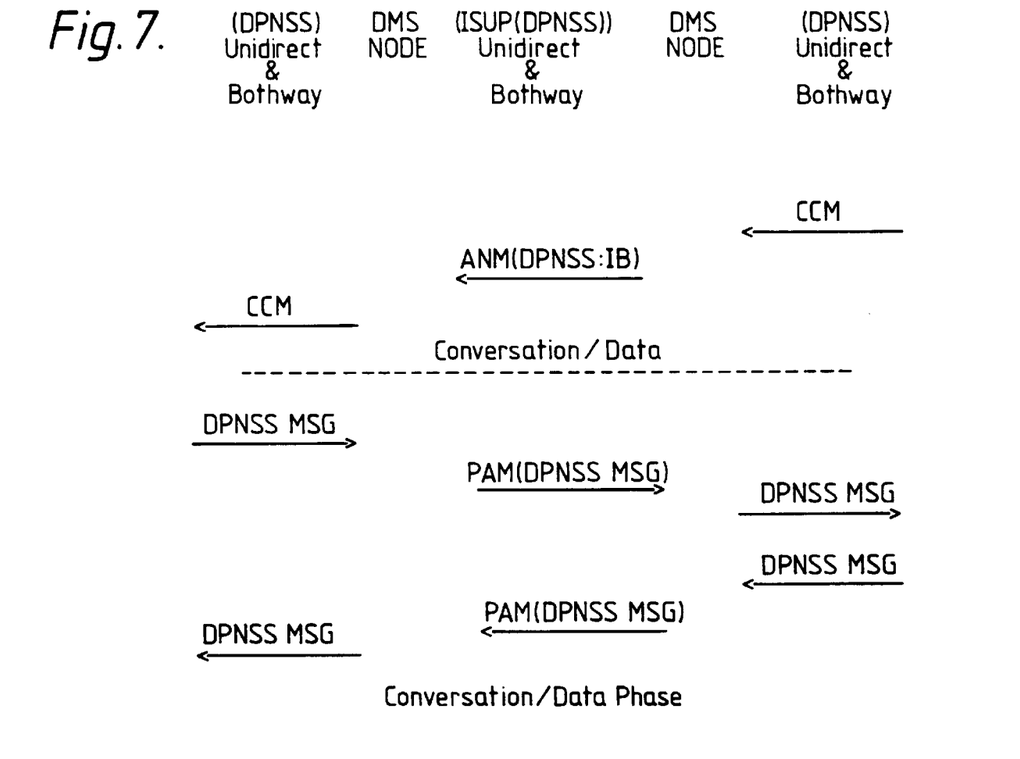
FIG. 7 illustrates the speech phase of a call.

This phase, illustrated in FIG. 7, begins with the receipt of a backward DPNSS CCM Acknowledge Message, and ends when release is initiated.

Release Phase

The Release Phase can be initiated from any other phase during the call. Release is activated on a link-by-link basis. On receipt of a DPNSS CRM message, an ISUP REL message is generated and sent over the ISUP link. Likewise, on receipt of an ISUP REL message, a DPNSS CRM is generated by the DMS, and sent over the DPNSS link. The DPNSS indication block information will be mapped into the ISUP REL message and passed to DPNSS respectively.

In response to the CRM message, a DPNSS CIM is generated and sent over the DPNSS link. In response to an ISUP REL message an ISUP RLC is generated and sent over the ISUP link.

Figure 8:
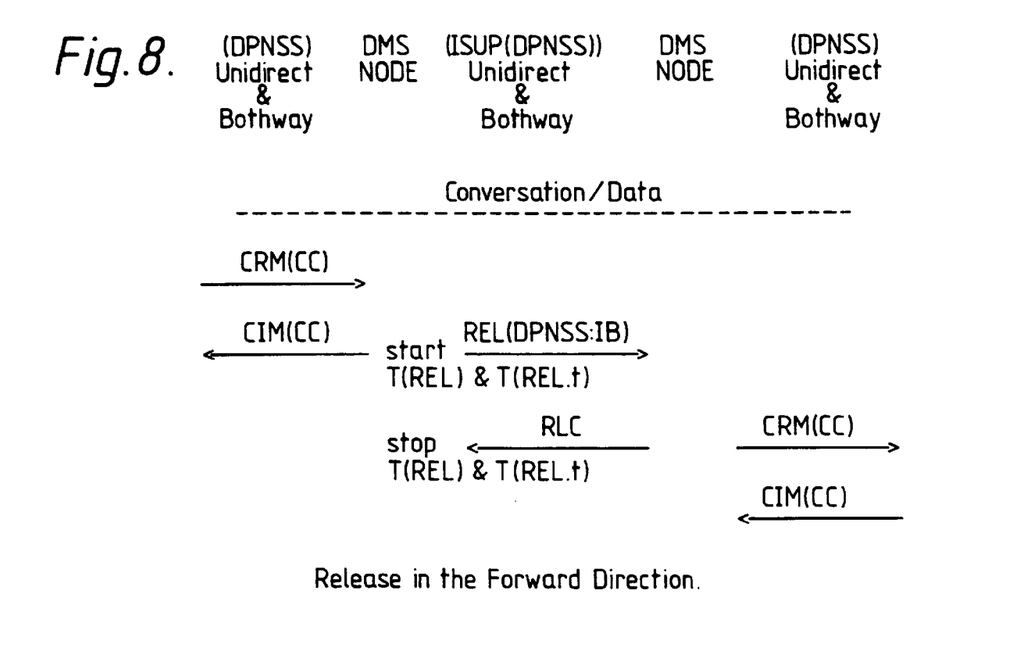
FIGS. 8 and 9 illustrate respectively forward and backward release of a call.
Figure 9:
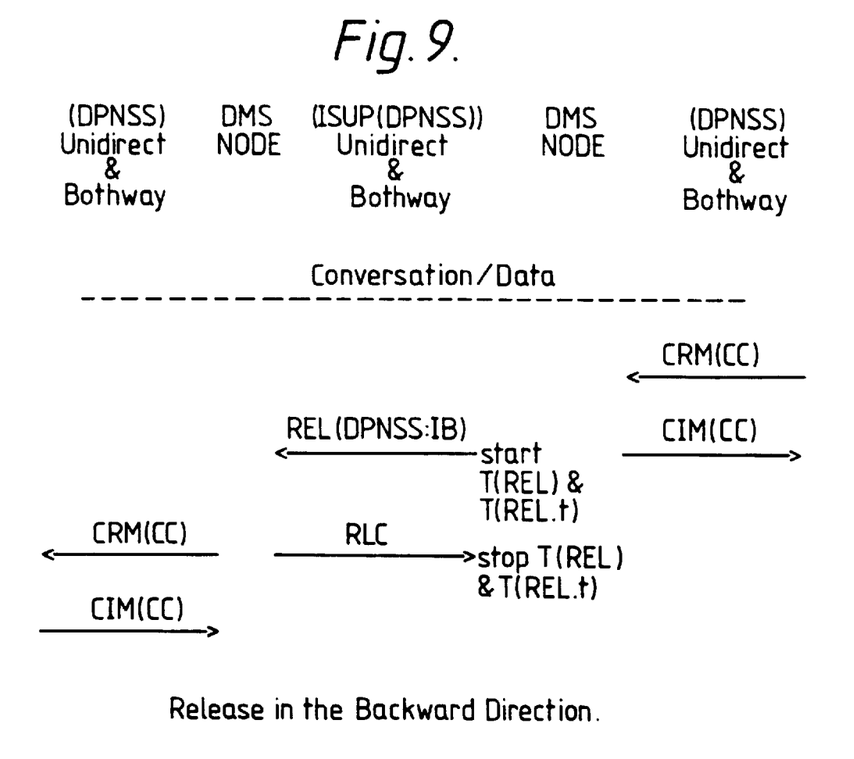

FIGS. 8 and 9 illustrate the release procedure for forward direction release and backward direction release respectively.

Idle Phase

This phase begins when the RLC/CIM message appropriate to the circuit being idled is received.

The Virtual Call

The DPNSS 'Virtual Call' is a mechanism for communicating information between nodes, when a physical circuit is not required, for instance when registering and cancelling a Diversion supplementary service, or when making a Call Back When Free request. The equivalent functionality is provided by the ANSI Transaction Sub-Layer (TSL) and the ANSI Signalling Connection Control Part (SCCP). A limited portion of the ANSI Component sub-layer is also supported to handle error conditions.

As a general principle the DPNSS 'Virtual' call signalling messages and procedures can be considered as the same as those for a 'Real' call. The DPNSS 'Virtual' call can be considered as a 'Query'/'Response' cycle, performed with the DPNSS ISRM and CRM messages respectively, this maps well to the Transaction Sub-Layer (TSL) 'Query'/ 'Response' transaction. The capability to pass on any DPNSS message received during a 'Virtual' call is supported across the CCS7 network to ensure that the principle of DPNSS transparency can be followed if thus functionality is required at any time.

Figure 10:
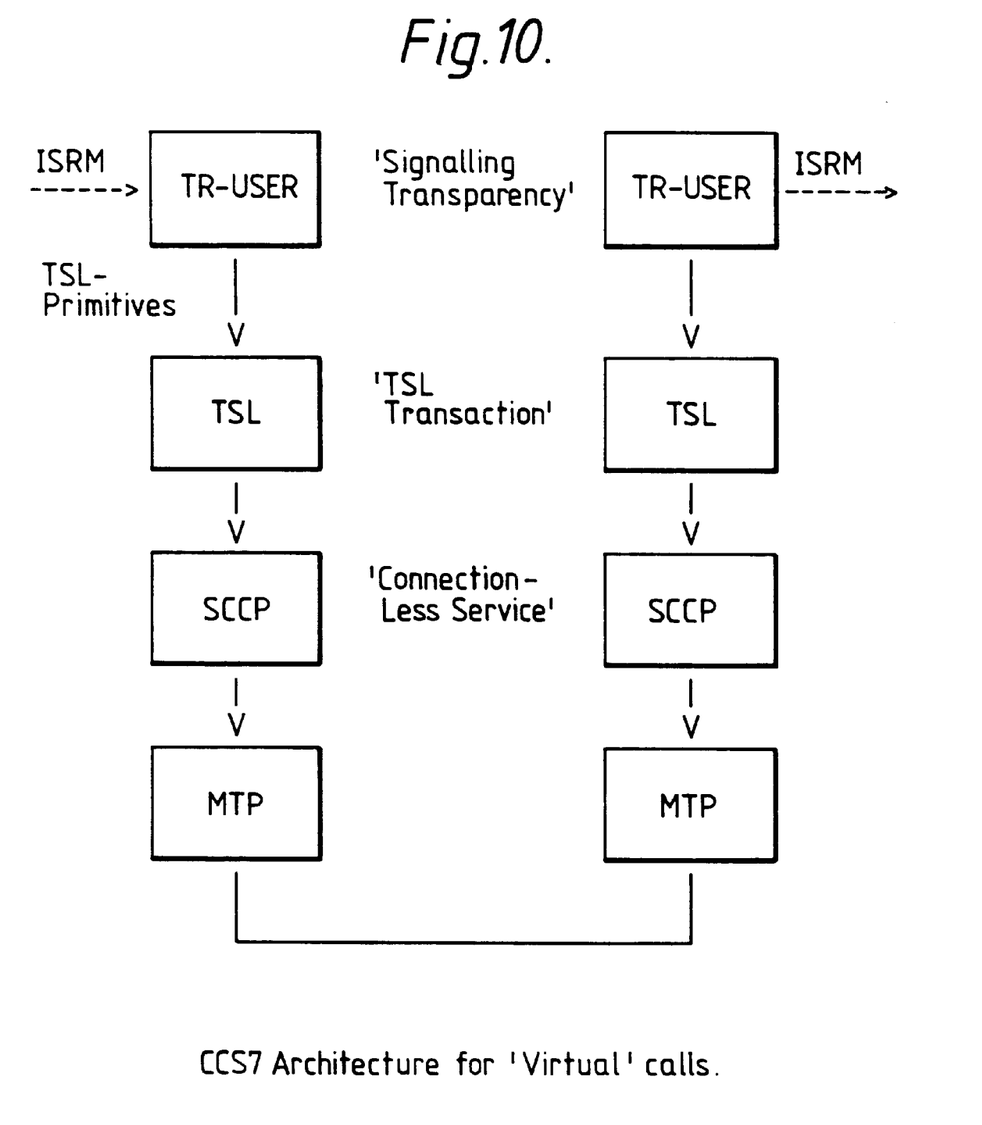
FIG. 10 illustrates the support structure of a virtual call in the system of FIG. 1.

The structure used for the support of 'Virtual' calls is shown schematically in FIG. 10. A new Transaction User (TR-User) is created called 'Signalling Transparency'. This application assigns transaction identifiers (TRID) and encapsulate/extract the received DPNSS messages to and from TSL-primitives. It utilises the TSL services to provide a connection-oriented association between the two peer TR-Users at the originating and terminating CCS7 nodes. At the transport level the SCCP connectionless service is used to route the TSL messages across the CCS7 network.

Figure 11:
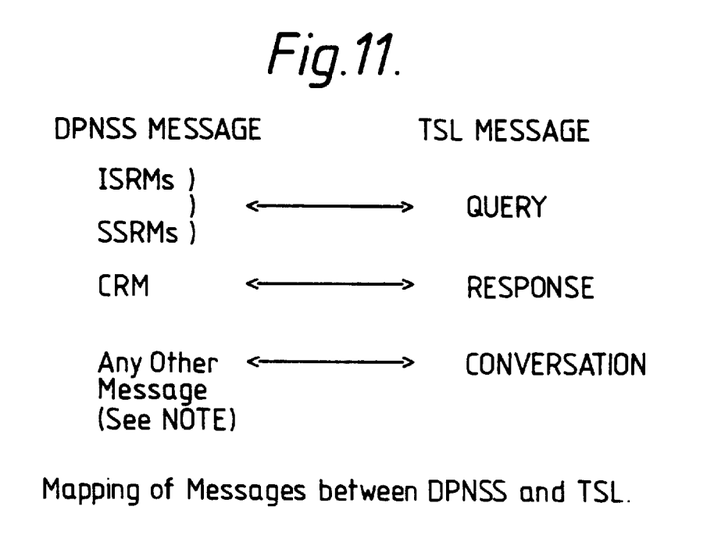
FIG. 11 illustrates the high level mapping of virtual messages.

FIG. 11 shows a high level mapping of DPNSS 'Virtual' messages to and from TSL messages. Within the description any reference to the TSL QUERY message should be interpreted as QUERY with permission, and any reference to the TSL CONVERSATION message should be interpreted as CONVERSATION with permission.

The DPNSS 'Virtual' call, as mentioned previously, can be thought of as a single transaction. Within the following section the signalling messages and procedures for such a transaction will be defined. The specific procedures relating to each of the three possible scenarios ('Transit', 'Gateway', and 'End' node capabilities) will be discussed separately. This is illustrated schematically in FIG. 12. As for 'Real' calls, the underlying principle in the transit case is to pass on any information received at the CCS7 end nodes. A number of TSL messages are used between the originating and terminating nodes to convey the DPNSS information. A TSDL Query message is issued to begin a transaction, a TSL Conversation message is issued to allow a continuation of the transaction, and a TSL Response message is issued to end the transaction. TCAP protocol errors are reported via a Reject component within a Response or Unidirectional message. Application errors are reported via a Return Error component within a Response or Unidirectional message.

On receipt of all the DPNSS Selection Block information (obtained from an ISRM(C) or a sequence of ISRM(I), SSRM(I)s ands SSRM(C)), the DMS node attempts to assign a TSL Transaction Identifier (TRID) to identify the transaction at the CCS7 originating node.

If successful, the DMS node generates a TSL QUERY message, from information within the DPNSS Selection Block, and information held at the DMS. The DPNSS message(s) is carried transparently within the QUERY message. The message will be sent to the succeeding node, via the CCS7 SCCP connectionless service. An association between the assigned TRID and the DPNSS virtual channel identifier is maintained by the DMS for the duration of the transaction, in order to route correctly any further messages.

If the attempt to assign a TRID is not successful, the DMS node will fail the call with a DPNSS CRM indicating 'Congestion'.

At any DMS transit nodes the SCCP message received will be progressed as a normal connectionless SCCP message.

On receipt of a TSL QUERY request at the DMS terminating node, the QUERY message is validated, and the DMS node attempts to allocate a TRID.

If successful an 'Empty' TSL CONVERSATION message, i.e. containing no user data) is generated by the DMS and sent to the originating node to acknowledge the received message. This acknowledgement procedure must be carried out for the DPNSS transparency application, so that any further DPNSS messages received at the CCS7 originating node can be progressed over the CCS7 network, (i.e. the 'terminating nodes' TRID is required at the CCS7 originating node before any other message can be sent in the forward direction). Once the TSL QUERY message has been validated and a TRID assigned, the DPNSS message is extracted from the QUERY message, and processed as normal in order to determine the DPNSS outgoing route. A timer to supervise the outgoing DPNSS 'virtual' call is started on sending the 'virtual' ISRM message. An association between the CCS7 terminating nodes TRID and the DPNSS virtual channel identifier is maintained by the DMS node for the duration of the transaction, in order to route correctly any further messages.

If the attempt to assign a TRID is unsuccessful, a return error component is generated by the DMS and sent within a Unidirectional message to the originating node to terminate the attempted transaction.

Figure 13:
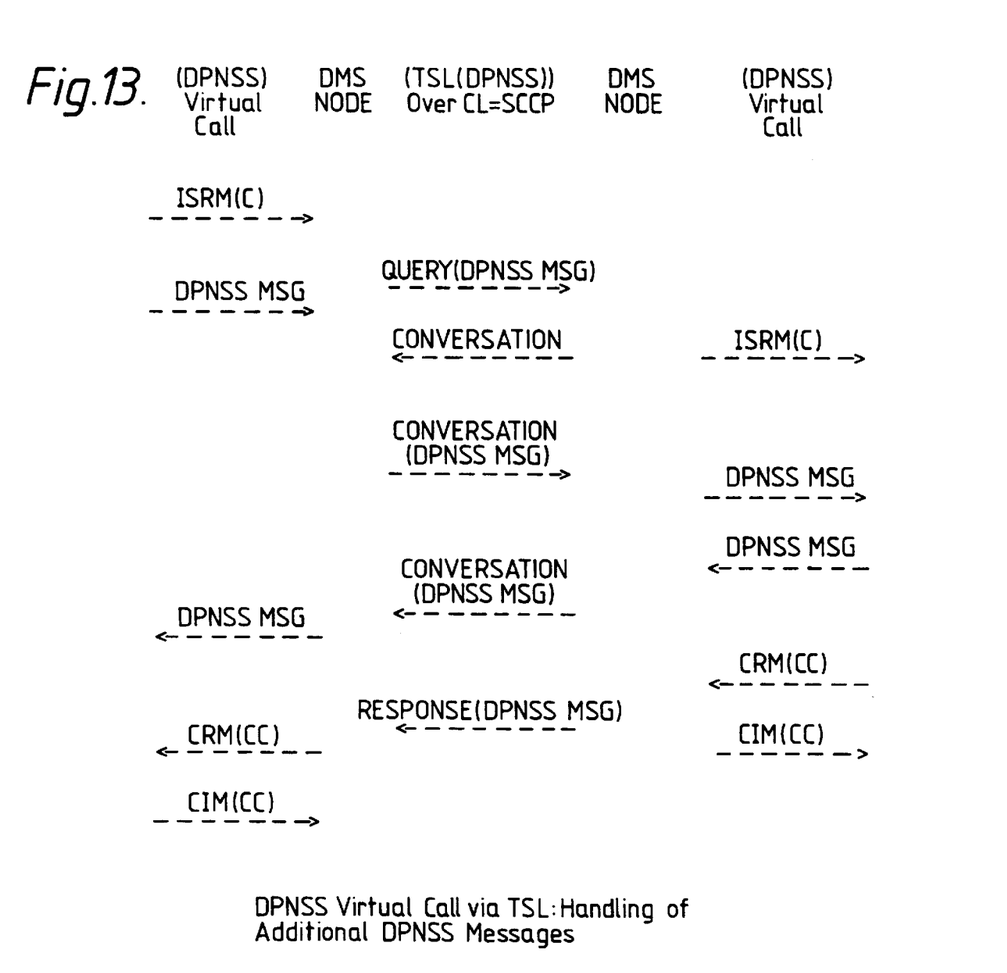
FIG. 13 illustrates the handling of additional messages in a virtual call.

Any further DPNSS messages received for the 'Virtual' call are held at the DMS until the TSL CONVERSATION message, providing the TRID of the CCS7 terminating node arrives. Once received any DPNSS messages being held at the DPM, other than CRM, are encapsulated in TSL CONVERSATION messages and sent over the CCS7 link as illustrated in FIG. 13. Messages, such as the EEM(I)s that have to be buffered at the DMS before being sent over each link, can be collected together and sent within a single TSL CONVERSATION message. The limit on the number of messages being determined by the DPNSS Indication Block limit of 135 octets.

On receipt of any further TSL CONVERSATION messages from the CCS7 terminating node, the DMS extracts the DPNSS message, processes it as normal, and sends it over the preceding DPNSS link.

Figure 14:
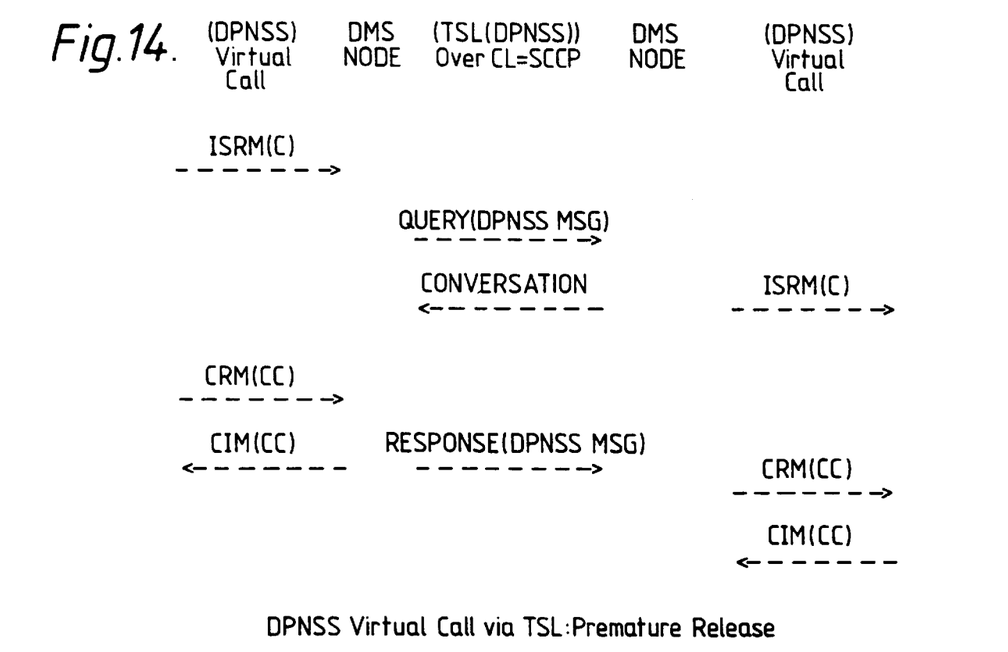
FIG. 14 illustrates premature release of a virtual call.

A DPNSS CRM message received in the forward direction indicates that the DPNSS 'Virtual' call should be released, and hence is mapped to a TSL RESPONSE message to initiate the termination of the TSL transaction. A DPNSS CIM message is generated in response to the CRM, and sent over the preceding DPNSS link. The TSL TRID is then released. This procedure is illustrated in FIG. 14 of the drawings.

On receipt of a TSL RESPONSE message, the DPNSS CRM message is extracted and sent, and the TSL TRID is released. If a TSL Response or unidirectional message is received containing a Reject or Return Error component, the DMS fails the 'Virtual Call' with a DPNSS CRM. At any DMS transit nodes the SCCP message received is progressed as a normal connectionless SCCP message.

At the DMS terminating node, any backward DPNSS message received for the 'Virtual' call, other than CRM, is mapped into a TSL CONVERSATION message and sent over the CCS7 link.

Figure 15:
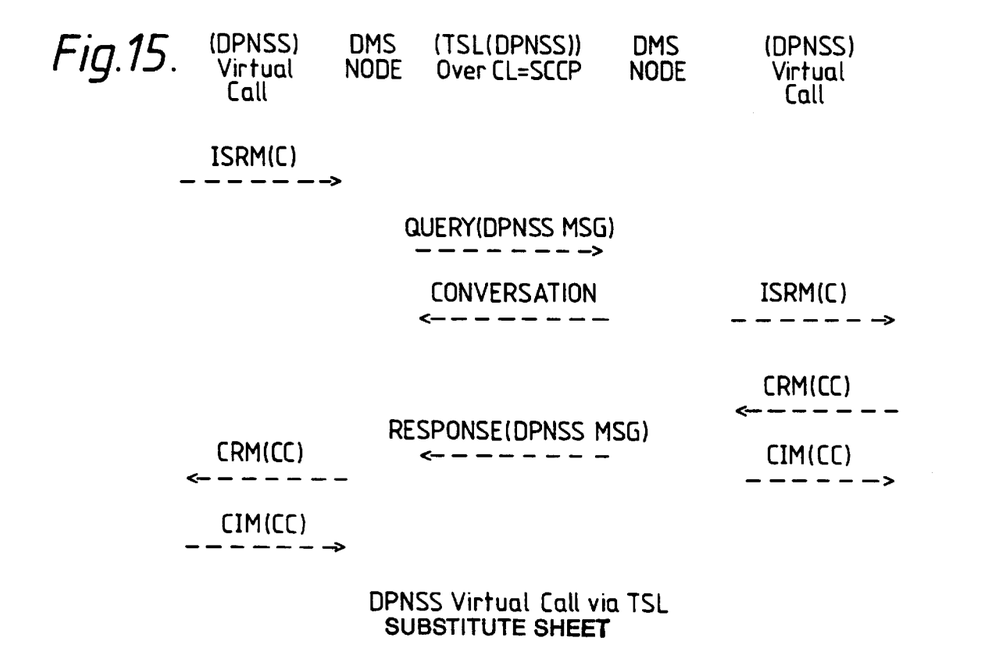
FIG. 15 illustrates processing of a virtual call at a terminating node.

A DPNSS CRM message received in the backward direction indicates that the DPNSS 'Virtual' call should be released, and hence is mapped to a TSL RESPONSE message to initiate the termination of the TSL transaction. A DPNSS CIM message is generated in response to the CRM, and sent over the preceding DPNSS link as illustrated in FIG. 15.

On receipt of any TSL CONVERSATION message from the CCS7 originating node, the DMS extracts the DPNSS message, processes it as normal, and sends it over the succeeding DPNSS link. On receipt of a TSL RESPONSE message, the DPNSS CRM message is extracted and sent and the TSL TRID is released.

It will be appreciated that adaptation of the technique to telephone systems other than those described above may be achieved by the provision of suitable mapping and inverse mapping functions between the public and private systems.

We claim:

1. A telecommunications system incorporating a public switched network having a first signalling protocol, and a circuit switched private network having a further signalling protocol and comprising a plurality of private exchanges (PBX's) or nodes between which communication can be established via circuits set up between the private exchanges in the public network, wherein telephone calls between said private exchanges comprise real calls in which a voice circuit is established between private network terminals and virtual or connectionless calls which carry signalling information without the establishment of a voice circuit, and wherein both real and virtual calls between said private exchanges are routed across the public network, the system having means for mapping call signalling information from said further private network protocol to a corresponding equivalent public network message containing signalling information in said first protocol of the public network, means for inverse mapping call signalling information from said first protocol of the public network to that of the private network whereby to provide a transparent communications path via the public network between the private exchanges of said private network, and means for carrying transparently within a first signalling protocol message across the public network private network signalling information in said further signalling protocol for which no equivalent message is available in the first signalling protocol.

2. A telecommunications system as claimed in claim 1, wherein calls routed across the public network between said private exchanges are provided with a signalling format in which signalling messages between private exchanges are conveyed over two or more linksets in tandem passing through one or more nodes of the public network.

3. A telecommunications system as claimed in claim 2, wherein said first signalling comprises a common channel signalling protocol.

4. A method of providing telecommunications signalling via a circuit switched public network having a first signalling protocol between a plurality of nodes or private exchanges (PBX's) a constituting a circuit switched private network having a further signalling protocol, wherein private network calls are set up by signalling between said private exchanges via the public network, wherein telephone calls between said private exchanges comprise real calls in which a voice circuit is established between private network terminals and virtual or connectionless calls which carry signalling information without the establishment of a voice circuit, and wherein both real and virtual calls between said private exchanges are routed across the public network, the method including mapping signalling information in said further signalling protocol to a corresponding equivalent public network message containing signalling information in said first signalling protocol associated with the public network when such an equivalent message is available in the first signalling protocol, routing said corresponding public network message across the public network, and inverse mapping at a said private exchange the signalling information in said first signalling protocol associated with the public network in said public network message to the signalling information in said further signalling protocol associated with the private network whereby to provide a transparent communications path between the exchanges of the private network, and wherein private network signalling information in said further signalling protocol for which no equivalent message is available in the first signalling protocol is carried transparently within a first signalling protocol message across the public network.

5. A method as claimed in claim 4, wherein calls routed across the public network between said private exchanges are provided with a signalling format in which signalling messages between private exchanges are conveyed over two or more linksets in tandem passing through one or more nodes of the public network.

* * * * *